United States Patent Office 3,182,043
Patented May 4, 1965

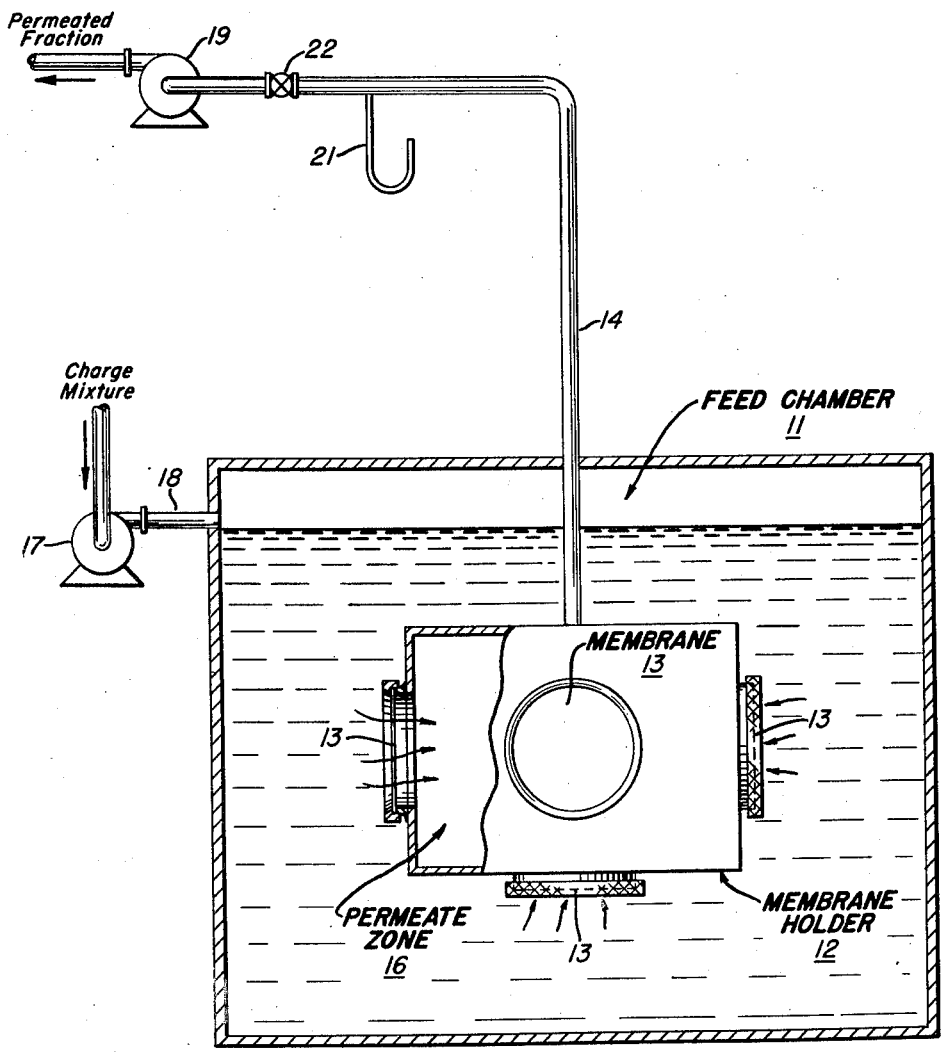

3,182,043
REMOVAL OF WATER FROM MONOCARBOXYLIC ACIDS BY MEMBRANE PERMEATION
Earl V. Kirkland, Millington, N.J., assignor to Standard Oil Company, Chicago, Ill., a corporation of Indiana
Filed Dec. 30, 1960, Ser. No. 79,802
12 Claims. (Cl. 260—87.1)

This invention relates to a separation process and more particularly concerns a permeation process for separating water from organic acids utilizing improved permeation membranes.

In the synthesis of organic chemicals many of the processes utilize monocarboxylic acids as solvents or as reactants such as in esterification. Also, in the oxidation of hydrocarbons to oxygenated compounds low molecular weight monocarboxylic acids are synthesized directly or are produced as a by-product in the production of other acids or compounds such as esters, aldehydes, and alcohols. The recovery of the synthesized acids as well as the acids which have been used as solvents or reactants poses a serious problem for the organic chemicals industries. Known methods for separating these acids either utilize water in their recovery step or, as in oxidation or esterification, water is produced as a by-product. These monocarboxylic acids can be partially recovered by distillation but inevitably the water present poses a problem in its separation from the acids. Final removal of the water from the acids must be achieved by indirect methods. Also, the corrosive action of the acids necessitates the use of expensive equipment.

I have found that water can be successfully separated from aqueous solutions of monocarboxylic acids by the use of the membrane permeation process. The use of the permeation process in these separations has heretofore been thought to be impossible because most of the polymeric materials used as membranes were not resistant to the acid and would dissolve in the feed mixture or during the permeation. The ones that were found to be resistant were also found to be essentially impermeable, thus eliminating their use. Films of copolymers of vinyl chloride and vinyl acetate are in the former class. They will dissolve under permeation conditions in aqueous solutions of monocarboxylic acids. Several chemical modifications of these copolymers have been made in an effort to improve their stability and selectivity but none were successful. Much to my surprise however I have now discovered that a particular series of modifications gives a highly improved vinyl chloride-vinyl acetate copolymer which gives excellent permeation rates and selectivity when formed into a membrane and used in the permeation of aqueous solutions of monocarboxylic acids. This series of modifications is conducted by first hydrolyzing the acetate groups in the copolymer, next cyanoethylating a portion of the hydroxyl groups followed by cross linking a portion or all of the remaining hydroxyl groups. The excellent permeation rate and selectivity of the modified copolymers make them useful in the commercial practice of membrane permeation. This discovery affords a solution to a very pressing problem in organic chemical synthesis.

In its fundamental form, a permeation unit consists of an enclosed vessel separated into two chambers by the permeation membrane. The charge mixture to be separated is introduced into one chamber wherein it contacts one side of the permeation membrane. The permeation membrane permits the preferential permeation of one component o fthe charge mixture in preference to other components thereof. Thus the portion of the charge mixture which permeates through the membrane and is removed from the opposite side thereof into the permeation zone is enriched in that component of the charge mixture which permeates more rapidly. Permeation is a non-equilibrium process, i.e., the concentration of the more rapidly permeating component in contact with the charge side of the permeation membrane must be higher than the concentration of this same component in contact with the permeate side of the membrane, or otherwise permeation will not occur. Non-equilibrium conditions are usually provided for by rapidly withdrawing the permeated portion in contact with the permeate side of the membrane. As to the physical conditions employed during permeation, the charge mixture introduced into the feed zone may be in the liquid state, and the permeated portion may be removed from the opposite side of the membrane in the vapor or liquid state; or the charge mixture can be maintained in the vapor state and the permeated portion removed from the opposite side of the membrane in the vapor state. Higher pressures are employed in the feed zone than in the permeate zone. A pressure differential of from 0.5 to 50 atmospheres may exist between the feed and permeate zones. The pressure differential between the two zones requires that the permeation membrane display considerable strength. The permeation membrane is a thin film usually less than 10 mils in thickness, and generally about 0.5 to 1.0 mil or thereabouts in thickness. Temperatures as high as the permeation membrane is capable of withstanding without rupturing due to thermal instability in the presence of the mixtures undergoing separation are generally employed, since the rate of permeation increases in the neighborhood of 50% for 10 to 20° C. increase in temperature.

The copolymers of vinyl chloride and vinyl acetate which can be modified and formed into membranes according to this invention are available commercially or can be made by well known techniques that are discussed in detail in United States Patent 2,075,429 to Douglas and in Schildknecht's book entitled "Vinyl and Related Polymers."

These copolymers range from about 60 to 95% vinyl chloride with the balance being vinyl acetate. An example of their preparation is to mix 260 parts vinyl chloride, 65 parts vinyl acetate, 325 parts hexane and 1.62 parts benzoyl peroxide. This mixture is continuously agitated in a lead-lined autoclave for 60 hours at 40° C. giving a copolymer which is a voluminous powder. Another method comprises continuously copolymerizing vinyl chloride with vinyl acetate in butane solution under pressure at 30° C. using acetyl benzoyl peroxide as the initiator. The vinyl chloride-vinyl acetate copolymer described above is modified for use in this invention in three modification steps. In the first step, substantially all the acetate groups of the copolymer are hydrolyzed. This is accomplished by placing the copolymer in solution with a solvent, such as methanol in the presence of caustic, such as sodium hydroxide or potassium hydroxide, together with a catalyst, such as guanidine carbonate. Secondly, the hydrolyzed copolymer, containing hydroxyl groups, is then partially cyanoethylated by placing the hydrolyzed copolymer in an anhydrous, nonalcoholic solution, such as anhydrous dioxane, and reacting the solution with acrylonitrile in the presence of a strong base catalyst such as benzyl trimethyl ammonium hydroxide. From about 25 to 95%, preferably from about 60 to 90%, of the hydroxyl groups in the polymer are replaced by (2-cyano) ethoxy groups. The third step of the modification is to take the above partially cyanoethylated hydrolyzed copolymer and cross-link a portion or all of the remaining hydroxyl groups. This can be accomplished in an anhydrous, nonalcoholic solvent, such as dioxane, in the presence of a cross-linking agent such as tolylene diisocyanate. Between about 0.2 and 1.0 mol. of tolylene diisocyanate per mol. of hydroxyl group is used in the presence of a trace of basic catalyst, such as N-methyl morpholine. In this reaction, about one molecule of diisocyanate reacts with one hydroxyl group. The resulting polymer thus has unreacted isocyanate groups which are reacted during a "curing" process with water. The latter reaction involves crosslinking of the polymer molecules through the isocyanate groups. Preferably, this final curing or crosslinking is accomplished after the solution has been cast and the solvent evaporated. The resulting film will react with atmospheric moisture or the reaction may be accelerated by treating with steam or water to yield the tough selective modified films of this invention.

In the above modification if only about 25% of the hydroxyl groups of the hydrolyzed copolymers are cyanoethylated and the remaining ones crosslinked then the films should be cast before curing. However if about 95% of the hydroxyl groups are cyanoethylated and the remaining ones crosslinked then the polymer should be cured before casting. In general the preferred films for use in my process have most of the hydroxyl groups cyanoethylated.

The membrane permeation process is well known and has been described in detail in U.S.P. 2,953,502 to Binning and Lee. It is known that the rate of permeation through the membrane increases as thickness of the membrane decreases. To take advantage of this phenomenon very thin permeation membranes are used; in other words, .01 to 10 mils in thickness. However, despite their very thin form these membranes have been successfully used in sizes which are commercially useable.

Permeation is distinct from dialysis (wherein materials of colloidal size are separated from molecules which are of small size) or mass diffusion. In permeation, all of the components of the mixture to be separated permeate through the membrane. The different components making up the mixture will permeate through the membranes at different rates and thereby permeation provides a means for concentrating certain components of the mixture. Repeated processing enables the recovery of the components of a mixture in relatively pure form. The term "selectivity" (which is used herein) is a measure of how high the membrane material will concentrate a given component of the feed mixture in the permeated portion. In this respect, it is similar to the terms beta and alpha used in solvent extraction and fractionation, respectively. To illustrate the effectiveness of the present invention, a number of examples are shown hereinafter which demonstrate the practical advantages of the invention.

The accompanying drawing, which forms a part of the specification, represents in schematic form a small size permeation apparatus which was used in carrying out the permeation runs. The permeation apparatus consisted of a box-like feed chamber 11 for the feed mixture of liquid introduced therein; a smaller size membrane holder 12 of box-like shape having 5 open faces across which the permeation membranes 13 prepared in a manner to be described were sealed, the 6th face having sealed thereto a line 14 for removing the portion which permeates through the membrane into the interior (permeate zone 16) of the membrane holder, the entire membrane holder being positioned within feed chamber 11. Pump 17 passes the charge mixture, which has been heated to the desired permeation operating temperature, through line 18 into feed chamber 11 until the liquid level of the charge mixture is substantially above membrane holder 12. The permeated portion is continuously withdrawn from permeate zone 16 through line 14 by means of vacuum pump 19. Manometer 21 and pressure regulating valve 22 measure and regulate the pressure in permeate zone 16. The total surface area provided by the membranes was approximately 22 sq. in.

A number of experiments have been carried out which demonstrate the present invention. In these experiments the feed mixture of aqueous acetic acid, which had the composition indicated in Table I below for each of the individual runs, was introduced into the feed zone of a permeation apparatus. The feed mixture in each run was maintained in the liquid state in the feed zone under refluxing conditions at the permeation temperatures and pressures indicated. The permeate zone was maintained at a pressure such that the permeated mixture as it passed through the membrane was immediately vaporized. The permeate vapors were rapidly and continuously withdrawn from the permeate zone. These vapors were collected and the composition determined.

Films used in the individual runs shown in Table I were prepared by the following methods.

The film used in Run 1 was prepared from a copolymer of vinyl chloride (87 parts) and vinyl acetate (13 parts) by dissolving the powdered copolymer in a 50–50 solution of toluene and methyl ethyl ketone and casting a 0.5 mil film.

In Run 2 a portion of the same copolymer used in Run 1 was hydrolyzed and cyanoethylated by dissolving 186 gms. of the copolymer in 1500 cc. of dry dioxane, warming the solution to 60° C., adding 5 grams of potassium hydroxide and 2 grams of guanidine carbonate in 25 cc. of water, followed by stirring for 6 hours. The solution was cooled and precipitated by pouring into water. The precipitated polymer was soaked over night, then separated, dried and redissolved in 1500 cc. of acetone. This solution was added to water and the polymer again precipitated, separated and dried. Forty-eight grams of this hydrolyzed copolymer were then dissolved in 500 cc. of dry dioxane and to this were added 4.1 grams of acrylonitrole and 0.5 cc. of a 35% methanol solution of benzyl trimethyl ammonium hydroxide. This solution was stirred for 4 hours at 40 to 45° C. and permitted to cool while stirring for an additional hour. The polymer was then precipitated by adding the solution to water. The precipitate was permitted to soak in the water over night after which it was recovered and dried. This hydrolyzed and cyanoethylated copolymer was dissolved in dioxane (2 gms. per 18 cc. of dioxane) and cast into 0.55 mil thick films.

The films for Runs 3 and 4 were prepared by dissolving 150 gms. of vinyl chloride (95 parts)-vinyl acetate (5 parts) copolymer in a mixture of 2 liters of methyl ethyl ketone and 100 cc. of cyclohexanone. To this solution were added 10 gms. of potassium hydroxide in 10 gms. of water. The solution was stirred at 50–60° C. for 8 hours after which 1.5 gms. of guanidine carbonate in 20 cc. of water were added and the solution permitted to stand over night. The next day the solution was stirred for 3 hours at 50–60° C. after which it was added to water and the hydrolyzed copolymer precipitated, washed, and dried. This hydrolyzed copolymer was dissolved in methyl ethyl ketone (10 gms. in 125 cc. of MEK) and 0.95 cc. of tolylene diisocyanate (one mol of diisocyanate for each mol of hydroxyl group in the hydrolyzed polymer) and three drops of N-methyl morpholine were added. This mixture was stirred at 50° C. for about 2 hours after which the solution was added to water to precipitatae and cure the polymer. Two grams of the hydrolyzed and crosslinked polymer were dissolved in 27 cc. of dry dioxane and 2 cc. of N,N-dimethyl formamide and then cast into a 0.5 mil film.

The films for Runs 5 through 14 were prepared by starting with a portion of the hydrolyzed and cyanoethylated copolymer used in casting the film for Run 2 described above. Ten grams of this copolymer were dissolved in 100 cc. of dry dioxane and 0.5 cc. of tolylene diisocyanate and 1 drop of N-methyl morpholine were added. The solution was stirred for 30 minutes at about 50° C., cooled and poured into water to precipitate and cure the polymer. The polymer was separated, washed, dried and 2 grams dissolved in 27 cc. of dioxane alone with 1 cc. of N,N-dimethyl formamide. After warming and mixing another 1 cc. of N,N-dimethyl formamide was added and films were cast from this solution. The foregoing modification of the copolymer used to form these films resulted in a hydrolyzed-cyanoethylated-crosslinked vinyl chloride-vinyl acetate copolymer which is the modified copolymer of this invention.

The results of permeation runs employing the modified copolymer permeation membranes prepared as described above are shown in Table I below for the separation of water from aqueous acetic acid.

TABLE I

*Permeation of aqueous acetic acid through modified vinyl chloride-vinyl acetate copolymer*

| Run No. | Film Modification [1] | Film Thickness, mils | Perm. Temp., °C. | Pressure Charge Zone, p.s.i.g. | Pressure Permeate Zone, mm. | Acetic Acid, Wt. percent Charge | Acetic Acid, Wt. percent Permeate | Permeation Rate, lbs./hr./1,000 ft.[2] | Rupture Temp., °C. |
|---|---|---|---|---|---|---|---|---|---|
| 1 | None | 0.5 | Ruptured | 0 | 100 | 50 |  | Nil | 106 |
| 2 | Hyd.-Cyano | 0.55 | Ruptured | 0 | 100 | 70 |  | Nil | 70 |
| 3 | Hyd.-Cr | 0.5 | 135 |  | 100 | 70 |  | Nil |  |
| 4 | Hyd.-Cr | 0.5 | 150 |  | 100 | 70 | 65.4 | 497 | 160 |
| 5 | Hyd.-Cyano.-Cr | 0.4 | 70 |  | 100 | 70 |  | Nil |  |
| 6 | Hyd.-Cyano.-Cr | 0.4 | 120 | 0 | 100 | 70 | 16.7 | 279 |  |
| 7 | Hyd.-Cyano.-Cr | 0.4 | 140 | 40 | 100 | 70 | 23.2 | 816 |  |
| 8 | Hyd.-Cyano.-Cr | 0.5 | 150 | 50 | 100 | 70 | 34.0 | 1,938 |  |
| 9 | Hyd.-Cyano.-Cr | 0.4 | 160 | 85 | 100 | 70 | 60 | 8,420 | 170 |
| 10 | Hyd.-Cyano.-Cr | 0.5 | 140 | 42 | 100 | 24.5 | 12.1 | 1,741 |  |
| 11 | Hyd.-Cyano.-Cr | 0.5 | 140 |  | 100 | 90 | 65 | 1,036 |  |
| 12 | Hyd.-Cyano.-Cr | 0.8 | 140 |  | 100 | 67 | 18 | 72 |  |
| 13 | Hyd.-Cyano.-Cr | 0.8 | 150 |  | 100 | 67 | 24 | 885 |  |
| 14 | Hyd.-Cyano.-Cr | 0.8 | 140 |  | 100 | 90 | 60 | 757 |  |

[1] Hyd.—hydrolyzed; Cyano.—cyanoethylated; Cr.—crosslinked.

It can be observed from the foregoing table that the unmodified vinyl chloride-vinyl acetate copolymer film ruptured at a low temperature before any permeation occurred. Therefore, such a film is not suitable for separating water from aqueous acid solutions. This is also true of the film used in Run 2. Even though the copolymer used to make the film for this run had been hydrolyzed and cyanoethylated in an attempt to make it stable, it still ruptured at a low temperature. In Runs 3 and 4 a hydrolyzed and crosslinked vinyl chloride-vinyl acetate copolymer was used; but here at the lower temperature of 135° C., no permeation occurred and even though at 150° C. there was substantial permeation, there was essentially no selectivity (i.e. the permeating mixture had almost the same composition as the charge). In order for membrane permeation to be useful in separating components, the film must be selective for one of the components. The films used in Runs 5 to 14 were copolymers of vinyl chloride and vinyl acetate which had been modified according to my invention by first hydrolyzing the copolymer, followed by cyanoethylating a portion of the hydroxyl groups and finally crosslinking non-cyanoethylated hydroxyl groups. As Runs 5 to 14 show these modified copolymer films exibited varying degrees of selectivity and permeation rates in separating water from aqueous acetic acid. Depending upon the concentration of the charge mixture, the permeation temperature should be varied between about 120° C. to about 160° C. in order to get the best results.

While I have shown the performance of the films of my invention for separating water from acetic acid, it should be understood that these films can also be used in separating water from other low molecular weight monocarboxylic acids such as formic acid, propionic acid and butyric acid. Also varying ratios of vinyl chloride and vinyl acetate can be used in the copolymer. Other methods of hydrolyzing the copolymers will be apparent to those skilled in the art as well as other methods of cyanoethylating and crosslinking.

What is claimed is:

1. A process for separating water from an aqueous solution of a monocarboxylic acid having from one to about 3 carbon atoms, which process comprises introducing the aqueous solution into a feed zone of a permeation apparatus, said permeation apparatus being comprised of a permeate zone and a feed zone and said feed zone is separated from said permeate zone by a thin plastic membrane, permeating a portion of the water through the film into the permeate zone, rapidly withdrawing the permeated portion from the permeate zone and withdrawing from the feed zone a non-permeated portion which is enriched in the monocarboxylic acid, said thin plastic membrane having been prepared from a vinyl chloride-vinyl acetate copolymer of from 60 to 95% vinyl chloride and from 40 to 5% vinyl acetate sequentially modified by converting substantially all of the acetate groups through hydrolysis to hydroxy groups, converting from 25 to 95% of the hydroxyl groups formed during the hydrolysis to (2-cyano) ethoxy groups, and reacting substantially all of the remaining 75 to 5% of the hydroxyl groups with a diisocyanate.

2. The process of claim 1 wherein the monocarboxylic acid is formic acid.

3. The process of claim 1 wherein the monocarboxylic acid is acetic acid.

4. The process of claim 1 wherein the monocarboxylic acid is propionic acid.

5. The process of claim 1 wherein substantially all remaining 75 to 5% hydroxyl groups are reacted with tolylene diisocyanate.

6. A modified vinyl chloride-vinyl acetate copolymer of 60 to 95% vinyl chloride and from 40 to 5% vinyl acetate produced by the steps of converting substantially all of the acetate groups through hydrolysis to hydroxy groups reacting with acrylonitrile from 25 to 95% of the resulting hydroxyl groups, and reacting the remaining 75 to 5% of the hydroxyl groups with a diisocyanate.

7. A vinyl chloride-vinyl acetate copolymer of from 60 to 95% vinyl chloride and from 40 to 5% vinyl acetate which has been sequentially modified by (1) converting through hydrolysis substantially all of the acetate groups to hydroxyl groups (2) reacting acrylonitrile with from about 20 to about 98 percent of the hydroxyl groups formed during the hydrolysis, and (3) reacting substantially all the remaining hydroxyl groups with tolylene diisocyanate to provide crosslinking.

8. A membrane permeation process for separating water from a low molecular weight monocarboxylic acid which process uses as the membrane a thin film prepared from a vinyl chloride-vinyl acetate copolymer of from 60 to 95% vinyl chloride and from 40 to 5% vinyl acetate sequentially modified by (1) converting substantially all of the acetate groups through hydrolysis to hydroxyl groups, (2) reacting with acrylonitrile 60 to 90% of the hydroxyl groups formed during hydrolysis, and (3) reacting with tolylene diisocyanate substantially all of the remaining 40 to 10% of the hydroxyl groups under crosslinking conditions.

9. The process of claim 8 wherein the monocarboxylic acid is formic acid.

10. The process of claim 8 wherein the monocarboxylic acid is acetic acid.

11. The process of claim 8 wherein the monocarboxylic acid is propionic acid.

12. The process of claim 8 wherein the copolymer of vinyl chloride and vinyl acetate contains from about 5 to 25% vinyl acetate.

References Cited by the Examiner

UNITED STATES PATENTS

| | | | |
|---|---|---|---|
| 2,075,429 | 3/37 | Douglas | 260—87.1 |
| 2,277,083 | 3/42 | Dorough | 260—91.3 |
| 2,374,136 | 4/45 | Rothroch | 260—91.3 |
| 2,381,063 | 8/45 | Kung | 260—91.3 |
| 2,593,540 | 4/52 | Cornwell et al. | 210—23 |
| 2,536,114 | 1/51 | Weaver et al. | 260—87.1 |
| 2,569,470 | 10/51 | Hagemeyer et al. | 260—881 |
| 2,681,320 | 6/54 | Bodamer | 210—23 |
| 2,852,499 | 9/58 | Benedict et al. | 260—87.1 |
| 2,985,588 | 5/61 | Binning | 210—23 |
| 3,035,060 | 5/62 | Binning | 210—23 |

OTHER REFERENCES

Schildknecht: Vinyl and Related Polymers, pages 398–402, Wiley (1952).

JOSEPH L. SCHOFER, *Primary Examiner.*

H. N. BURSTEIN, WILLIAM H. SHORT, *Examiners.*